United States Patent [19]
DeNoyer

[11] 3,870,628
[45] Mar. 11, 1975

[54] PARTS SEPARATOR
[75] Inventor: Donald B. DeNoyer, Beloit, Wis.
[73] Assignee: Beloit Corporation, Beloit, Wis.
[22] Filed: Dec. 7, 1973
[21] Appl. No.: 422,840

[52] U.S. Cl. .................................. 209/90, 209/97
[51] Int. Cl. ........................................... B07b 13/04
[58] Field of Search .......... 209/90, 97, 85, 100, 112

[56] References Cited
UNITED STATES PATENTS
1,758,509   5/1930   Garrison ........................... 209/90 X
3,412,855   11/1968  Nilmeier, et al. ................ 309/100 X

*Primary Examiner*—Allen N. Knowles
*Attorney, Agent, or Firm*—Dirk J. Veneman; Bruce L. Samlan; Gerald A. Mathews

[57] ABSTRACT

A biaxially tiltable table and associated gate for receiving products and runners from a plastic molding machine. Solely under the influence of gravity, the runners and products slide downwardly along, and to one side of, the table where the gate forms a gap of desired distance above and off the table edge which passes one or the other of the products and runners whereupon each of them falls into separate collectors.

3 Claims, 6 Drawing Figures

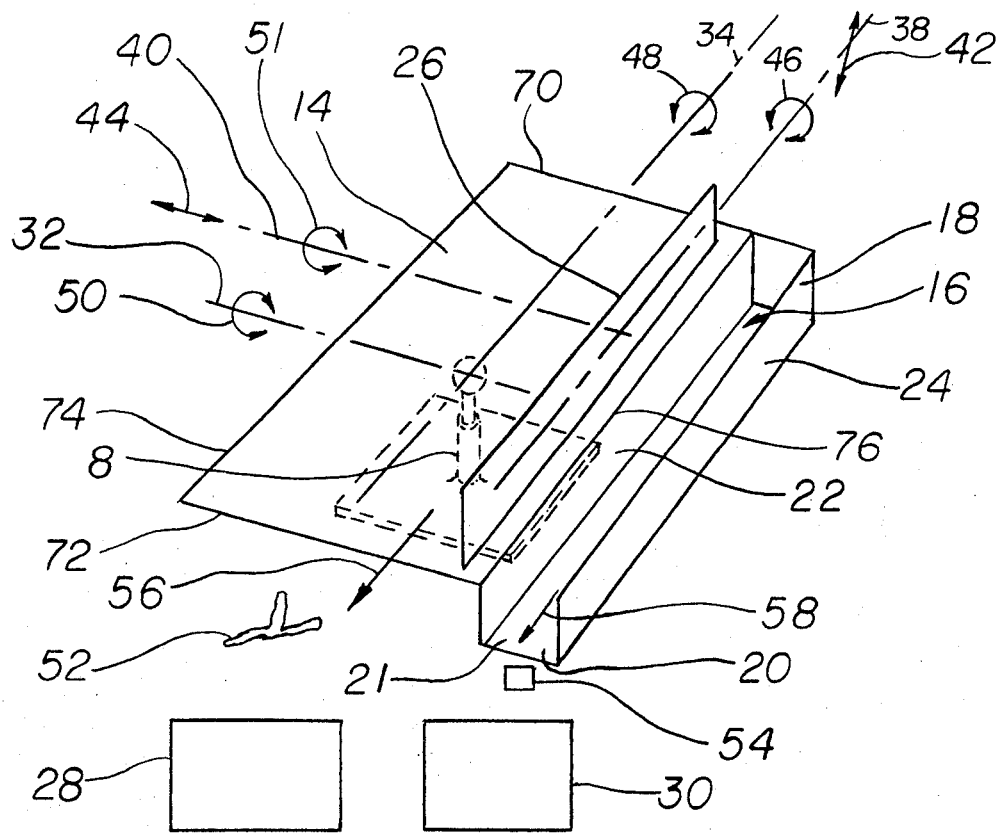
FIG. 1
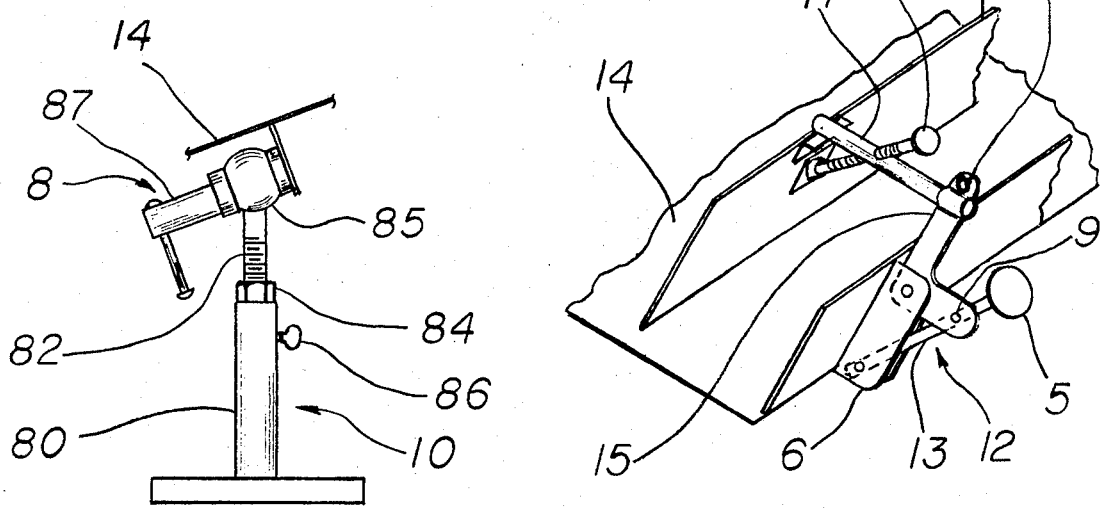
FIG. 1A
FIG. 1B

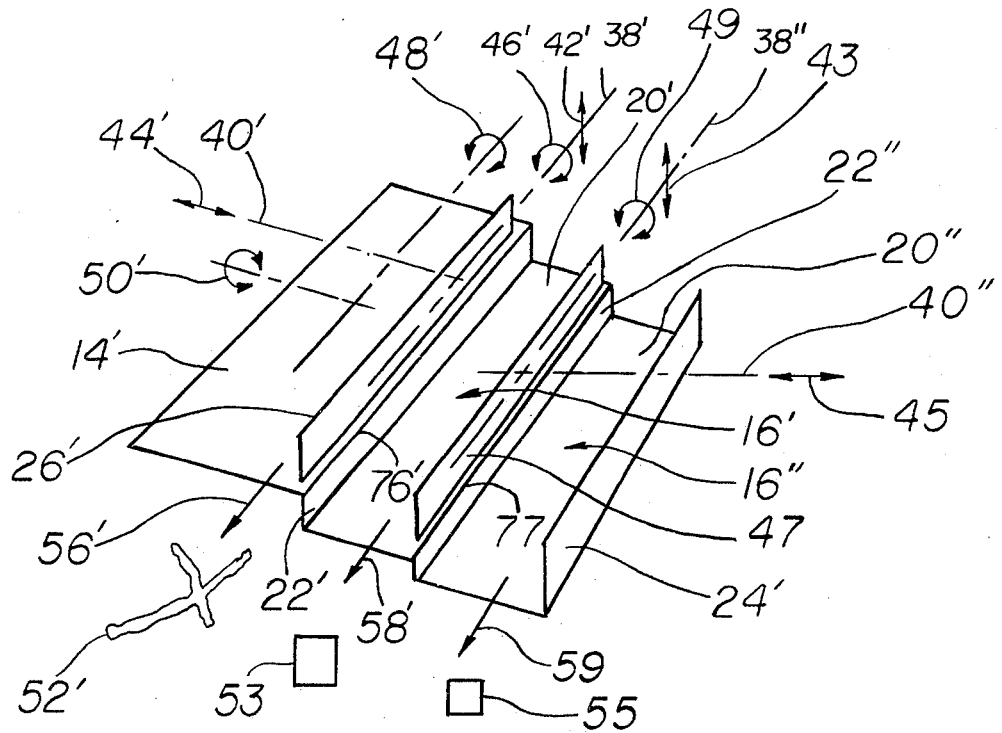
FIG. 2
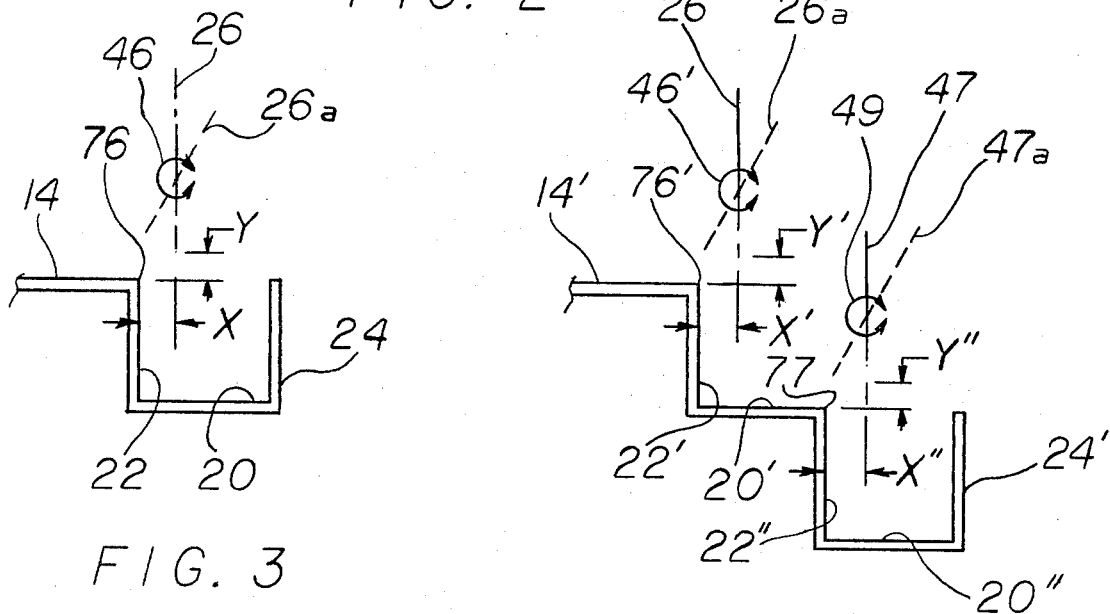
FIG. 3
FIG. 4

PARTS SEPARATOR

BACKGROUND OF THE INVENTION

This invention relates to separators and, more particularly, to apparatus for separating products and the runners formed in plastic molding processes.

Known separators usually operate by utilizing a plurality of moving or vibrating rods which are spaced to separate objects according to size. Since such apparatus requires a power source, they are relatively expensive to manufacture, maintain and operate. Often, the nature of the objects to be separated, such as the product and runners in a plastic molding process, do not require a sophisticated or accurately designed and constructed machine since the parts to be separated are not close in size or similar in shape. Thus, for many applications, an elaborate, relatively expensive separator is neither desired nor required.

SUMMARY OF THE INVENTION

This invention has very few parts, no moving parts, and requires no power to operate. The power to convey the parts along the separator is provided solely by gravity and the speed is adjustable by changing the slant of the table receiving the objects to be separated.

The objects are received on a biaxially tilted table whereupon gravity urges them to one side, over which a gate is mounted, and downwardly from one end to the other. The gate is adjustably positioned above and/or to one side of the table edge where it allows objects of one size to pass beneath it into a discharge trough and the remaining objects to travel along the gate for the length of the table where they drop off into another collection bin.

The relative position of the gate about the edge of the table is readily adjustable in any direction to allow quick change to accommodate new objects of different size and shape.

Accordingly, an object of the invention is to provide a simple and inexpensive separator for separating the runners from one or more products ejected from a plastic molding machine.

Another object of the invention is to provide a separator which can be easily adjusted to separate runners and products of different sizes.

Another object of the invention is to provide a nonpowered separator which has no moving parts.

These and other objects, features and advantages of the invention will become readily apparent to those skilled in the art when the description of the preferred embodiment is read in conjunction with the attached drawings.

BRIEF DESCRIPTION OF THE DRAWINGS

FIG. 1 is a perspective view of the invention showing the table, gate and collection trough.

FIG. 1A is an end view of the apparatus in FIG. 1 and more clearly shows the frame supporting the table.

FIG. 1B is a perspective view of the gate support member.

FIG. 2 is a schematic drawing of the table and a plurality of collection troughs and corresponding gates and the directions of their adjustability.

FIG. 3 is a cross sectional end view of the collection trough and gate of the table shown in FIG. 1.

FIG. 4 is a cross sectional end view of the table, gates and collection troughs shown in FIG. 2.

DESCRIPTION OF THE PREFERRED EMBODIMENTS

In FIGS. 1, 1A, a flat table 14 is mounted to a frame 10 through adjustable table support 8. This allows the table to be adjustably slanted about its longitudinal axis 34 and transverse axis 32 in the direction of double headed arrows 48, 50 into virtually an unlimited number of positions. A gate 26 extends longitudinally of the table over lower table edge 76. As shown, the table extends from an upper end 70 downwardly along parallel side edges 74, 76 to a lower end 72. Gate 26 has longitudinal and transverse axes 38, 40, respectively, which extend parallel with the respective table axes. The gate is mounted on a gate support member 12 through adjustable gate support screw 13 and arm 15 which allows it to be moved relative to the table surface in the general direction of double headed arrows 42, 44 which are perpendicular and parallel to the table surface, respectively. In addition, as shown in FIG. 1B, the rotatable rod 17, on which gate 26 is attached, permit the gate to be rotated about its transverse axis in the direction of arrow 51, by loosening thumb screw 19, and parallel to the table top. Similarly, by turning hand wheel 5, support screw 13 lifts the gate; turning adjustment screw 99, rotatably mounted between rod 17 and the gate, moves the gate into rotated position 26a. Thus, the gate can be raised in the direction Y, laterally moved in the direction X and rotated in the direction of double headed arrow 46 to provide an extremely wide variety of positions.

Objects, such as runner 52 and product 54, from a plastic molding process are received onto table 14 which, in operation, is slanted such that edge 76 is below the level of edge 74 and lower end 72 is below the level of upper end 70. The gate is adjusted so that the gap defined by coordinate distances X, Y of the bottom edge of the gate relative to the side edge 76 of the table permits the product 54 to pass therethrough into collection trough 16 and is too small to permit runner 52 to pass into collection trough 16. This could be reversed, as desired, to accommodate larger products and smaller runners.

The products and scrap material (runners) resulting from the plastic injection molding process (shown schematically throughout the drawings) are virtually always of dif different size and shape. Thus, if the product is relatively large and bulky, the gap can be used to permit the relatively thin runners to pass beneath and into collection trough 16 to be deposited into collection bin 30 while the product is retained between the table 14 and gate 26 for the length of the table where it falls off lower end 72 into collection bin 28. If the product is of a small nature, the runners can be designed to be longer, even having arms extending in three dimensions such that the product is passed beneath gate 26 into collection bin 30 while the runners are retained and ultimately pass into collection bin 28. Thus, if desired, the shapes of the products and runners can be utilized to allow the gate to separate them more effectively.

Throughout the figures, primes and subscripts will be used to designate corresponding items in the different embodiments. Reference to one of such numerals will be taken to mean a reference to all such numerals.

In FIG. 2, a modified embodiment of the table and trough is shown wherein two collection troughs 16', 16" and two corresponding gates 26', 47 are shown in cascaded array off the lower side edge 76' of the table. As in FIG. 1, the troughs are defined by sidewalls 22', 22" bottom walls 20', 20" and the outermost sidewall 24'. The troughs are shown attached to the table so that they are moved when the table is adjustably tilted into a new position. Obviously, the troughs could be independently mounted if desired. The bottom walls of the troughs are shown parallel to the surface of table 14', although they could be inclined differently if desired.

As shown in FIG. 2, the table in combination with multiple gates and troughs can be used to successively separate runners 52', product 53 and relatively smaller product 55 which are then dropped off the ends of the table or troughs, as the case may be, in the direction of arrows 56', 58' or 59. In a manner similar to the arrangement shown in FIG. 1, a second gate 47, having a longitudinally extending axis 38" and a transverse axis 40", is mounted in spaced adjacency to trough edge 77. Also in a similar manner, gate 47 can be adjusted (see FIG. 4) normally to, or laterally of, trough bottom wall 20' or side edge 77. The vertical movement is indicated by double headed arrow 43 and the lateral movement is indicated by double headed arrow 45. In addition, the gate 47 can be rotated about its longitudinal axis 38" in the direction of double headed arrow 49 to a slanted position 47a as shown in FIG. 4. Thus, the gap of the second gate can be defined by coordinate dimensions X", Y".

Additional control and flexibility of the separating process is permitted by selectively rotating gates 26 and 47 to take advantage of the product's shape and/or sliding characteristics of the runners or products of different size or shape.

In general operation, the gates are adjusted to provide a uniform gap for the entire longitudinal length of the table and gate so that the longitudinal axis of the gate, or gates, is parallel to the longitudinal axis of the table. The largest object, whether product or scrap material, such as a runner, is retained on the gate nearest the table where it eventually slides off the end of the table to be separately collected. The remaining objects then cascade laterally off the lowermost table edge 76 to be collected in trough 20. If additional separation is desired, a second gate 47 can be arranged with a smaller gap relative to edge 77 to permit the discharge of objects from the end of trough 16' while the smallest objects cascade over edge 77 and are collected in trough 16" to be eventually discharged. All of the objects from the table and troughs are collected separated as desired.

In all embodiments, the same type of table support 8 is used wherein a vertical shaft 80 is mounted on the frame. A threaded rod 82 is positioned within the shaft and held by nut 84 and thumb screw 86. A ball knob 85 on the end of rod 82 is engaged by a clamp screw 87 which in turn is mounted to the table 14. The whole table can then be tilted into practically any position.

Gate support member 12 is mounted on the trough side wall 22, or the outermost side wall, if more than one trough is used. A gate support arm 15, shaped like a bell crank, is pivotally mounted onto a gate support frame 6. A support screw 13 is threaded through a pivoted dowel 9 in one arm of the support arm 15 and its end is rotatably mounted to the gate support frame 6. Thus, turning hand wheel 5 on screw 13 causes rotatable rod 17 to move which repositions the gate relative to the table. Rod 17 can be pivoted by loosening thumb screw 19 in the top end of the gate support arm 15.

What is claimed is:

1. Apparatus for separating objects according to size and shape, such as the products and the runners from a plastic molding machine, comprising:
   a frame member;
   a table having longitudinal and transverse axes, about which it is biaxially adjustably mounted on the frame member and rotatably positioned about both axes to provide the table with a biaxial slant toward a lower end and edge thereof;
   a plurality of trough means, each having a bottom wall and a discharge end, arranged in cascading array extending from the table with one trough means positioned adjacent the lower table edge and each succeeding trough means positioned adjacent the bottom wall of the preceding trough means, the bottom walls extending in the same general direction as the table;
   gate means positioned in spaced relationship with the lower edge of the table and the bottom wall of each trough means, save the outermost one from the table, whereby each of the objects received on the table are successively separated into one portion passing beneath a gate and onto the succeeding trough, and another portion passing off the table end, or trough discharge end, all of which portions being collected separately, and each gate means is adjustable normally to, and parallel with, the associated table or trough bottom wall.

2. The apparatus as set forth in claim 1, wherein:
   each gate means has a longitudinal axis about which it can be adjustably rotated.

3. The apparatus as set forth in claim 1, wherein:
   the trough means are attached to the table and are biaxially movable therewith.

* * * * *